April 21, 1953 R. W. CLARK ET AL 2,636,093
PRESSURE SWITCH
Filed Aug. 9, 1950 2 SHEETS—SHEET 1
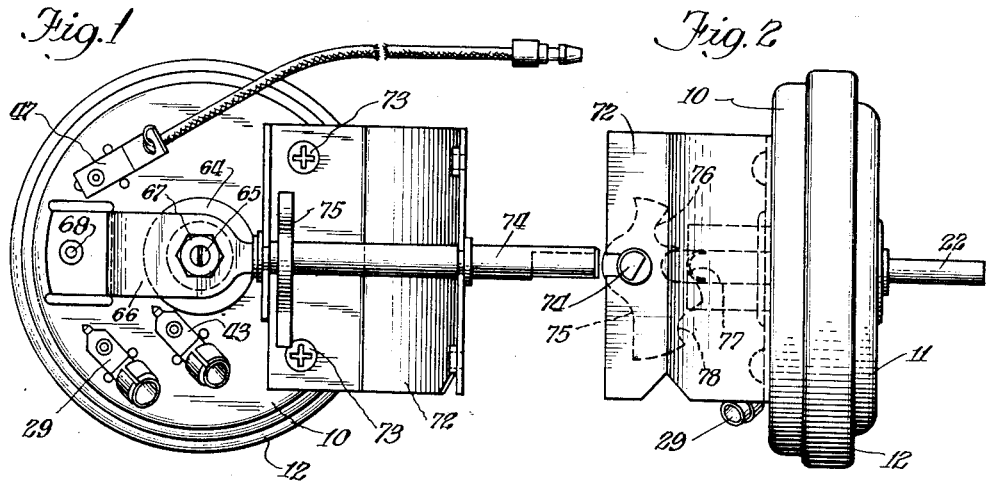
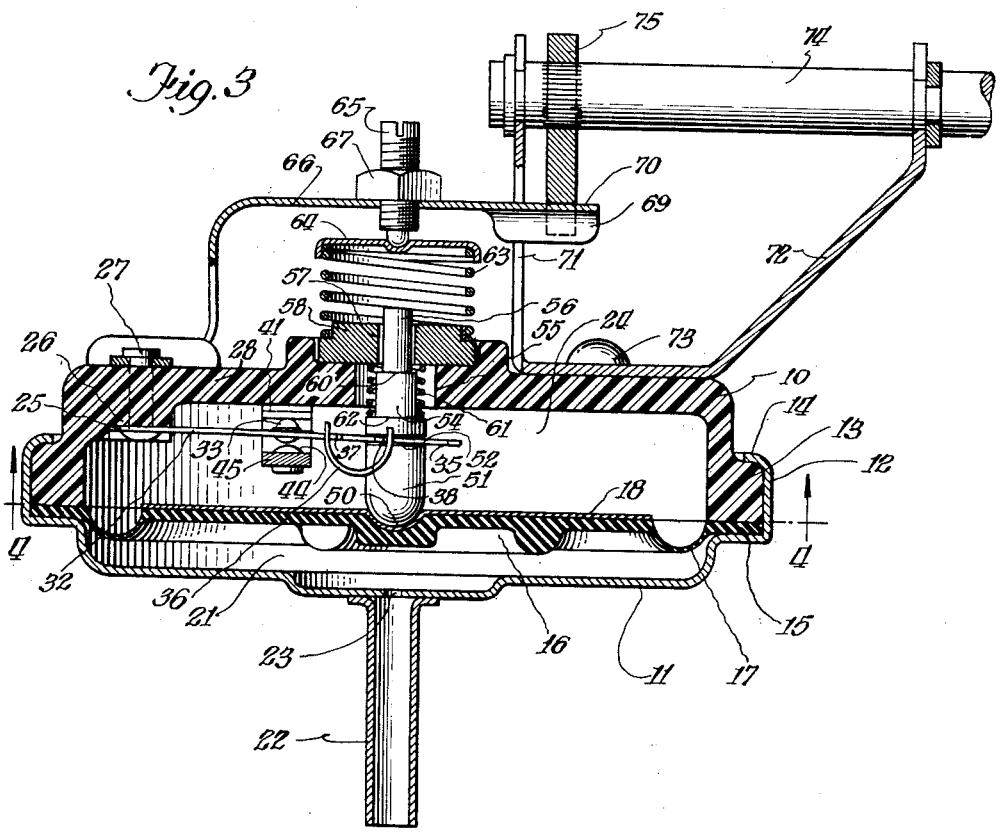
INVENTOR.
Ralph W. Clark
John C. Koonz
By: Arthur A. Smith
Attorney.

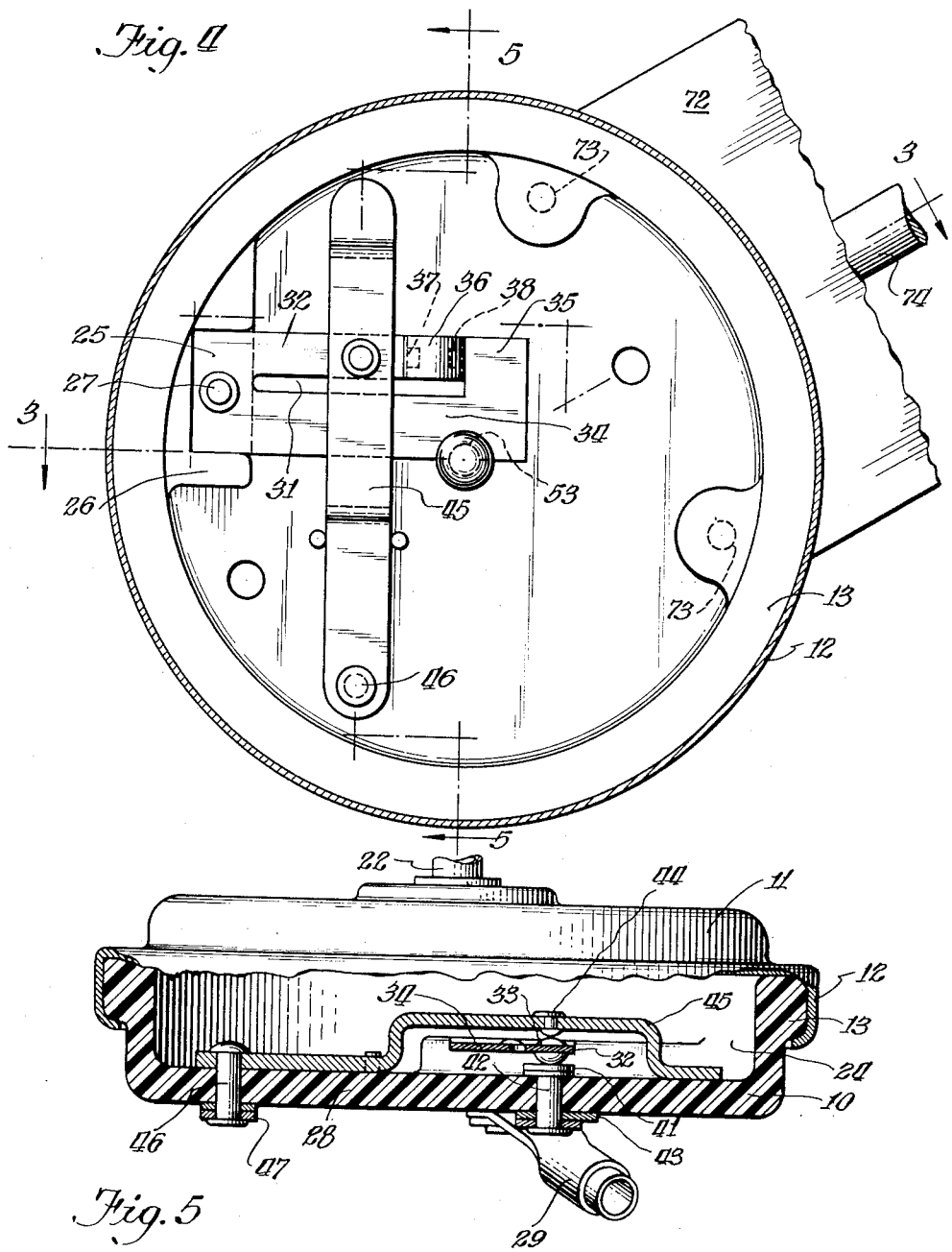

Patented Apr. 21, 1953

2,636,093

UNITED STATES PATENT OFFICE 2,636,093

PRESSURE SWITCH

Ralph W. Clark and John C. Koonz, Fort Wayne, Ind., assignors to The Magnavox Company, Fort Wayne, Ind., a corporation of Delaware Application August 9, 1950, Serial No. 178,404

5 Claims. (Cl. 200—83)

This invention relates to pressure switches. In some commercial applications, particularly in switches intended for controlling the operation of domestic washing machines, it is desirable to provide a pressure switch which is susceptible of ready adjustment to any one of several pressures, so that it can be used to interrupt the flow of water into the washing chamber at any desired level or levels. Thus, a domestic washing machine, when equipped with a pressure switch for regulating the water level therein, may be provided with a manual knob or dial, adjustable to set the machine so that it will fill to a high, medium or low water level according to the requirements of the moment. At the same time, it is essential that the switch reset itself at precisely the same minimum pressure on each actuation, irrespective of what its adjustment may be, to prevent the machine from beginning its extracting (spinning) cycle before the washing chamber is properly emptied.

It is, therefore, the primary object of this invention to provide a pressure switch wherein the switch contacts can be actuated at one specified pressure and reset at another pressure, but wherein alterations of the adjustment of the switch as to either of these pressures does not in any way alter the other setting. This is of particular advantage in a multiple level switch arranged to be actuated at any one of several pressures but to reset at the same pressure in every instance, since changing the adjustment of the pressure at which the switch operates on increasing pressure does not change the pressure at which the switch will reset. Thus, in a switch used to control the water level in a washing machine, the high pressure setting may be easily and conveniently varied to cause the switch to act at any desired maximum water depth, but the switch mechanism will nevertheless always reset at the same minimum depth.

It is a further object of the invention to provide a pressure switch in which the foregoing functional characteristics are obtained by a simple, compact and sturdy switch unit in which the adjustment of the maximum operating pressure may be quickly and easily altered by a simple mechanical control device so designed that it is self-locking in any one of its several positions.

A still further object of the invention is the provision of a pressure switch of the type indicated above, with an adjusting means common to the level setting devices, so that the initial adjustment of the switch may be easily and conveniently made by a single setting corresponding to one of the several water levels desired with assurance that when this setting has been determined, the other positions of the switch will be automatically predetermined also.

The foregoing objects are accomplished according to the present teaching by the provision of a switch employing a pressure sensitive unit in the form of a limp membrane or diaphragm which acts on a spring toggle switch through an actuating pin. There are provided, however, a pair of springs of unequal strength acting on a shiftable spring base and provided with a spring seat and coacting abutments so that the diaphragm, in actuating the switch at any of its several high pressure positions, compresses the heavier spring, but the position at which the switch resets is governed solely by the degree of compression of the lighter of said springs.

A preferred embodiment of the invention is illustrated in the drawings hereof, wherein:

Figure 1 is a plan view of an embodiment of the present teachings specifically suited for use as a water level control switch on a domestic washing machine;

Figure 2 is an end view thereof;

Figure 3 is an enlarged, transverse sectional view through the switch housing and its associated mechanism;

Figure 4 is a sectional view looking into the open side of the switch housing in the direction of the arrows 4—4 of Figure 3; and Figure 5 is an enlarged sectional view, partly in elevation, the view being taken substantially on the plane of the line 5—5 of Figure 4.

The switch mechanism is contained within and mounted on a housing which consists of a cup-shaped shell 10 and a cover 11 secured thereto. The shell 10 is of electrical insulating material and is preferably formed of molded plastic insulation. The cover 11 may be a metal stamping, having a circular flange 12 enclosing the flange 13 of the shell, with a bead 14 on the flange 12 crimped over the edge of the flange 13 to lock the parts together. The flange 13 of the shell 10 also serves to clamp the marginal edge portion 15 of a pressure sensitive diaphragm 16. The diaphragm 16 is preferably provided with an extremely thin and flexible annular edge portion 17 which is sufficiently limp so that the diaphragm is responsive to extremely minute changes in pressure of the air within the chamber. As shown, the diaphragm includes a relatively stiff metal disc 18 which maintains the central portion of the diaphragm relatively flat, and serves to transmit pressure from the diaphragm onto the switch with which it is associated.

The cover 11 is formed to provide a pressure chamber 21 on the outer surface of the diaphragm 16, and a pressure fitting 22 is soldered or welded to the cover so that a flexible tube or hose connection may be applied to the tube to transmit pressure through the port 23 to the chamber 21.

The shell 10 is provided with an internal cavity 24 in which the switch mechanism and its actuating device are enclosed. The moving part of the switch is an over-center leaf spring toggle having contacts on each side so that it acts as a single pole, double throw unit. The leaf spring of the toggle consists of a double spring blade having an end portion 25 secured to a boss 26 in the shell as by the rivet 27. As shown, this rivet extends through the back wall 28 of the housing shell and through a switch terminal 29.

The switch spring includes an L-shaped slot 31 dividing it into a relatively short, outwardly extending contact arm 32 having a moving contact 33 thereon, and an L-shaped blade 34 which extends outwardly beyond the end of the arm 32 and is provided with a lateral extension 35 extending across the end of the arm 32 and spaced therefrom. The arm 32 and blade 34 are joined by a U-shaped toggle spring 36 which has its opposite ends pierced to receive retaining tabs 37 and 38 on the outer end of the arm 32 and the inner edge of the extension 35. The toggle effect is obtained by mounting this U-shaped spring 36 so that it exerts a lateral thrust on the arm 32, whereby it will tend to snap upwardly or downwardly as blade 34 is moved through the plane of arm 32.

As previously stated, the arm 32 forms the moving element of a single pole, double throw electrical switch. To this end, a fixed contact 41 is mounted in the base 28 of the housing shell 10. This contact is positioned immediately below the contact 33 (Figure 5) and is carried on a rivet 42 which extends through the housing shell and carries a switch terminal 43 on the outside of the housing.

Another contact 44 is provided on the opposite side of the contact 33. As shown, this contact is mounted in an offset mounting strip 45 riveted to the wall 28 of the housing by a rivet 46 extending through and making contact with a third terminal fitting 47 of the unit.

From the foregoing it will be seen that the switch arm 32 has two acting positions; that is, a reset position when the contacts 33—41 are closed and an actuating position when the contacts 33—44 are closed. With this arrangement the switch contact 33 will snap into engagement with the contact 41 when the outer end of the blade 34 moves downwardly (Figure 3) into the plane of arm 32 in its actuating position, and the arm 32 will reverse its position and snap the contact 33 against the contact 44 when the outer end of the blade 34 is raised into the plane of arm 32 in its reset position. These two positions may be termed the reset and actuating positions of the switch, since they are the two different points at which the arm 32 will snap from one position to the other. Between these positions there will be an intermediate zone through which the outer end of the blade 34 may swing without actuating arm 32.

The pressure sensitive diaphragm 16 is directly coupled to the switch blade 34, so that the switch is actuated in response to changes of pressure in the chamber 21. This is accomplished by an actuating pin 51 having a rounded end in engagement with a socket or recess 59 at the center of the metal pressure disc 18. The pin 51 has an annular groove 52 into which the outer end of the blade 34 extends and, as shown, the blade 34 is notched at 53 so that the parts fit each other closely and move together at all times. The pin 51 includes a reduced portion 54 which extends into an aperture 55 in the back wall 28 of the housing shell, and a reduced pilot portion 56 which extends through a central aperture 57 of a shiftable spring base 58. Shell 10 is arranged to provide a seat for base 58 as illustrated in the drawings. A light pressure spring 61 extends between a shoulder 62 on the actuating pin and the underside of the shiftable spring base 58. A shoulder 60 on the pin is positioned to contact the underside of the spring base 58 after the spring 61 is partially compressed. A second spring 63, stronger than the spring 61, is mounted on the upper side of the spring base 58 whereby base 58 and shell 10 provides a limiting stop to limit downward expansion of spring 63. Spring 63 extends upwardly to a cap 64, against which a threaded adjusting screw 65 normally bears. The screw 65 is threaded through a flexible bracket or support 66 and secured in fixed position thereon by a lock nut 67.

The bracket 66 is riveted to the back of the casing shell 10 by a rivet 68 and extends outwardly from the casing and across the back thereof, so that the adjusting screw 65 is positioned at the center of the shell and in axial alignment with the spring 63. The bracket 66 has a slender end portion 69 bent to form a convex detent 70, which extends through a slotted portion 71 in a control shaft bracket 72 mounted on the back wall 28 of the shell 10 by a pair of machine screws 73. The bracket 72 carries a manually operable shaft 74 on which a combination cam and detent plate 75 is mounted. This plate is provided with a plurality of notches 76, 77, and 78 (Figure 2) so arranged that the plate serves both as an adjustment or setting device to flex the bracket 66 to any one of three predetermined positions, and also serves as a spring detent so that, when once set, the shaft 74 is held against accidental shifting.

The operation of the mechanism is as follows: The switch blade 34 and its actuating pin 51 are so dimensioned that when the shoulder 60 of the actuating pin contacts the underside of the shiftable spring base 58, the switch will be in an intermediate position approximately equidistant between its reset position and its actuating position. Thus, if no external pressure is acting on the diaphragm 16, the relatively light spring 61 will move the pin 51 downwardly and swing the blade 34 and switch arm 32 to the resetting (low pressure) position, with the contacts 33 and 41 closed. It is to be noted that this operation takes place under a condition of diminishing pressure in the chamber 21, and thus, when the device is employed to control the maximum and minimum water levels in a washing machine, for example, it will be clear that the minimum level will be governed solely by the balance of upward pressure exerted against the diaphragm 16 and the downward pressure of the spring 61, together with what force may be required to flex the spring blade 34 downwardly to the required point. It is important to note, however, that as the switch is thus operated under a condition of diminishing pressure in the chamber 21, the spring 63, bracket 66 and control shaft 74 have no function other than to maintain the shiftable spring base 58 in fixed position on its seat.

As the effective pressure in the chamber 21 is increased, the increasing force exerted on the diaphragm 16 will move the actuating pin 51 upwardly against the light spring 61 until the shoulder 60 of the pin engages the underside of the shiftable spring base 58. This occurs at an intermediate point in the movement of the switch blade 34. As the pressure in the chamber 21 continues to increase, the force exerted by the diaphragm 16 is transmitted directly through the pin 51 to the shiftable spring base 58, and thus as the pressure approaches a point sufficient to move the switch to its high pressure actuating position, the force of the diaphragm 16 is balanced against downward force exerted by the spring 63. With this arrangement, the pressure at which the switch operates on a condition of increasing pressure is governed primarily by the degree of compression of the spring 63. Thus, by increasing the tension of this spring, the switch may be caused to operate at a relatively high pressure, and by decreasing its tension the switch may be set for a correspondingly lower pressure. In any event, it is important to note that this setting may be varied at will without having any effect whatsoever on the minimum pressure at which the switch operates. The switch may thus be used as a conventional pressure switch, if desired, although it is contemplated that it finds its greatest usefulness as a multiple position switch, since it is possible to change the high pressure setting at will without influencing the pressure at which the resetting operation takes place. Thus, by manually rotating the shaft 74, the cam 75 may be caused to act on the detent portion 70 of the bracket 66 to increase or decrease the effective force of the spring 63.

We claim:

1. A multiple positioned pressure switch comprising a shell, a pressure operated diaphragm mounted across said shell to form a pressure chamber on one side of said diaphragm and a switch chamber on the other side of said diaphragm, a toggle switch in said second chamber including a switch arm movable between a low pressure actuating position and a high pressure actuating position, an actuator connected between said diaphragm and said switch arm, a movable support mounted on said shell, a pair of unequal springs mounted between said support and said actuator for determining response of said diaphragm, a limiting stop between said springs for limiting the movement of the stronger of said springs and determining the low pressure at which said diaphragm is effective to operate said switch, and plural position adjusting mechanism connected to the stronger of said springs for determining the high pressure at which said diaphragm is effective to operate said switch.

2. A multiple positioned pressure switch comprising a cylindrical shell, a pressure operated diaphragm mounted across said shell to form a pressure chamber on one side of said diaphragm and a switch chamber on the other side of said diaphragm, a toggle switch in said second chamber including a switch arm movable between a reset position and an actuating position, an actuator connected between said diaphragm and said switch arm, a movable support extending over the axis of said actuator, a relatively strong spring connected between said support and said actuator for determining actuating pressure on said diaphragm, a limiting stop between said spring and said actuator and normally spaced from said actuator, a relatively weak spring connected between said actuator and said stop for determining reset pressure on said diaphragm, and plural position adjusting mechanism operatively associated with said support for moving said support axially of said relatively strong spring for adjusting the pressure exerted by said spring and therewith the actuating pressure on said diaphragm.

3. A multiple positioned pressure switch comprising a cylindrical shell, a pressure operated diaphragm mounted across said shell to form a pressure chamber on one side of said diaphragm and a switch chamber on the other side of said diaphragm, a toggle switch in said second chamber including a switch arm movable between a reset position and an actuating position, an actuator abutting said diaphragm and connected to said switch arm, a movable support extending over the axis of said actuator, a relatively strong spring mounted between said support and said actuator for determining actuating pressure on said diaphragm, a movable base between said spring and said actuator and normally spaced from said actuator, a relatively weak spring mounted axially of said actuator between said actuator and said base for determining reset pressure on said diaphragm, and plural position adjusting mechanism operatively associated with said support for moving said support axially of said relatively strong spring for adjusting the pressure exerted by said spring and therewith the actuating pressure on said diaphragm.

4. A multiple positioned pressure switch comprising a cylindrical shell, a pressure operated diaphragm mounted across said shell to form a pressure chamber on one side of said diaphragm and a switch chamber on the other side of said diaphragm, a toggle switch in said second chamber including a switch arm, a movable blade, and a toggle spring connecting said element and said blade for moving said switch arm between a reset position and an actuating position when said blade is moved into the plane of said arm at either of said positions, an actuating pin abutting said diaphragm and connected to said blade and including first and second shoulders spaced with respect to one another and said diaphragm, a movable support mounted externally of said shell and extending over the axis of said pin, a relatively strong spring engaging said support axially of said pin, a movable base between said spring and said second shoulder and normally spaced from said second shoulder, a relatively weak spring mounted axially of said pin between said first shoulder and said base for determining reset pressure on said diaphragm, and plural position adjusting mechanism operatively associated with said support for moving said support axially of said relatively strong spring for adjusting the pressure exerted by said spring and therewith the actuating pressure on said diaphragm.

5. A multiple positioned pressure switch comprising a cylindrical shell, a pressure operated diaphragm mounted across said shell to form a pressure chamber on one side of said diaphragm and a switch chamber on the other side of said diaphragm, a toggle switch in said second chamber including a switch arm, a movable blade, and a toggle spring connecting said element and said blade for moving said switch arm between a reset position and an actuating position when said blade is moved into the plane of said arm at either of said positions, an actuating pin abutting said diaphragm and connected to said blade and including first and second shoulders spaced with respect to one another and said diaphragm, a movable bracket mounted externally of said shell and extending over the axis of said pin, a relatively strong spring engaging said bracket axially of said pin, a movable base between said spring and said second shoulder and normally spaced from said second shoulder, a relatively weak spring mounted axially of said pin between said first shoulder and said base for determining reset pressure on said diaphragm, and cam means operatively associated with said bracket for moving said bracket axially of said relatively strong spring for adjusting the pressure exerted by said spring and therewith the actuating pressure on said diaphragm.

RALPH W. CLARK.
JOHN C. KOONZ.

References Cited in the file of this patent

UNITED STATES PATENTS

| Number | Name | Date |
|---|---|---|
| 2,024,619 | Whitney | Dec. 17, 1935 |
| 2,259,265 | Pearce | Oct. 14, 1941 |
| 2,421,284 | Peterson | May 27, 1947 |
| 2,453,861 | Rothwell | Nov. 16, 1948 |
| 2,466,111 | Katcher et al. | Apr. 5, 1949 |